United States Patent [19]

Lippay

[11] 4,152,905
[45] May 8, 1979

[54] METHOD AND APPARATUS FOR REPAIR OF WINDSHIELD WIPER BLADE GUIDE ARM PIVOT PIN

[76] Inventor: Raymond R. Lippay, 839 Beechland Ave., Munhall, Pa. 15120

[21] Appl. No.: 832,171

[22] Filed: Sep. 12, 1977

[51] Int. Cl.² ............................................... F16C 1/00
[52] U.S. Cl. .................................. 64/1 C; 29/401 D; 403/11
[58] Field of Search ............ 29/401 D, 401 F; 32/12; 64/1 C; 403/11

[56] References Cited

U.S. PATENT DOCUMENTS

| | | | |
|---|---|---|---|
| 1,379,975 | 5/1921 | Golden | 29/401 |
| 1,954,359 | 4/1934 | Leake | 29/401 |
| 3,422,535 | 1/1969 | Johnson | 32/12 |
| 3,487,544 | 1/1970 | Weissman | 32/12 |
| 3,585,723 | 6/1971 | Simor | 32/12 |

*Primary Examiner*—Benjamin W. Wyche
*Assistant Examiner*—Wesley S. Ratliff, Jr.
*Attorney, Agent, or Firm*—Carothers and Carothers

[57] ABSTRACT

A replacement pin for a worn or broken guide arm pivot pin for a dual arm windshield wiper blade transmission assembly. The assembly comprises a transmission body having a shaft received through a bore for reciprocal rotation of a wiper blade arm secured to one end of the shaft and a guide arm pivot pin secured to the transmission body in parallel to the aforesaid shaft and adjacent to the end of the shaft which receives the wiper blade arm. This pin is provided to pivotally receive a wiper blade guide arm. The replacement guide arm pivot pin is coaxially received with a force fit over the remaining broken base portion of the original pivot pin.

8 Claims, 5 Drawing Figures

METHOD AND APPARATUS FOR REPAIR OF WINDSHIELD WIPER BLADE GUIDE ARM PIVOT PIN

BACKGROUND OF THE INVENTION

1. Field of Invention

This invention relates generally to the replacement of broken pins and more particularly to the replacement of pins on dual arm windshield wiper blade transmission assemblies which incorporate a wiper blade arm and a guide arm for the wiper blade arm.

2. Discussion of the Prior Art

The double or dual wiper arm on the driver's side of a motor vehicle is such that it is provided with a main wiper blade arm and a smaller guide arm which guides and centers the reciprocal action of the wiper blade arm over the windshield and also guides or parks the main wiper blade when the windshield wipers are turned off. This guide arm is pivotally secured to a guide arm pivot pin that is located just below the main wiper blade arm attachment to the wiper blade transmission body or housing. This small pin (about ¼ inch in diameter) has an annular groove adjacent the top thereof for receiving a clip which holds the guide arm in pivotal contact with the guide arm pin.

As the guide arm pivots on the guide pin, it continually wears the pivot pin down until it eventually breaks at the annular groove and the windshield wiper blade is thereafter inoperative.

The original guide arm pivot pins are not threadably received in the wiper blade transmission body, and therefore there is no way presently on the market to simply and readily replace the pivot pins. Instead, the entire wiper blade transmission must be replaced at a considerable expense to the car owner.

A principal object of the present invention is to provide a means and method for repairing or replacing such broken guide arm pivot pins without the requirement of replacing the entire wiper blade transmission assembly.

SUMMARY OF THE INVENTION

The present invention provides a method and apparatus for repairing windshield wiper blade guide arm pivot pins found in dual arm windshield wiper blade transmission assemblies. The transmission assembly consists of a transmission body having a shaft received therethrough in a bore for reciprocal rotation of the shaft. A lever arm is secured to one end of the shaft to impart reciprocal rotation to the shaft and a head is secured to the other end of the shaft for attachment of the main wiper blade arm. A guide arm pivot pin is secured to the transmission body in parallel to the shaft and adjacent to the head to pivotally receive the wiper blade guide arm thereon.

When the guide arm pivot pin eventually breaks due to wear, the replacement guide arm pivot pin of the present invention has a base portion with a bore therein which is coaxially received with a force fit over the remaining broken base portion of the pivot pin which is secured to the wiper blade transmission body.

The base of the replacement pivot pin is, of course, larger in diameter than the original pin base in order to permit the axial bore therein to receive the original pivot pin base with a force fit. Struck portions may be made in the side walls of the replacement pin in order to assure that the replacement pin will not rotate or otherwise move relative to the stationary remaining base portion of the original pivot pin. The head of the replacement pin is, of course, the same shape and diameter as the original pin to properly receive the guide arm in pivotal engagement.

When the original guide arm pivot pin has worn through or broken, it may be desirable to first file off any rough projection protruding from the top of the base portion of the remaining pivot pin before driving the replacement guide pin part thereover. This will insure proper and complete seating of the replacement guide arm pivot pin.

The replacement guide arm pivot pin is driven onto the remaining base portion of the original broken pin with the use of an inverted cylindrical cup-shaped tool which snugly slides over the top of the replacement guide arm pivot pin so that the tool may be rapped or driven down with a hammer, thereby in turn driving the replacement pivot pin over the original pin base without damage to the new replacement pin. The replacement guide arm pivot pin is preferably provided with an annular rim or shoulder upon which this inverted cup-shaped tool will readily seat. Thus, when driving hammer blows are applied to the top of the cup-shaped tool, all of the impact is applied to this annular shoulder, thereby insuring that the more delicate portions of the replacement pin at the top or head thereof where the wiper blade guide arm pivots will not be damaged.

BRIEF DESCIPTION OF THE DRAWINGS

Other objects and advantages appear in the following description and claims.

The accompanying drawings show, for the purpose of exemplification without limiting the invention or the claims thereto, certain practical embodiments illustrating the principles of this invention wherein:

DETAILED DESCRIPTION OF THE PREFERRED EMBODIMENT

Figure 1:
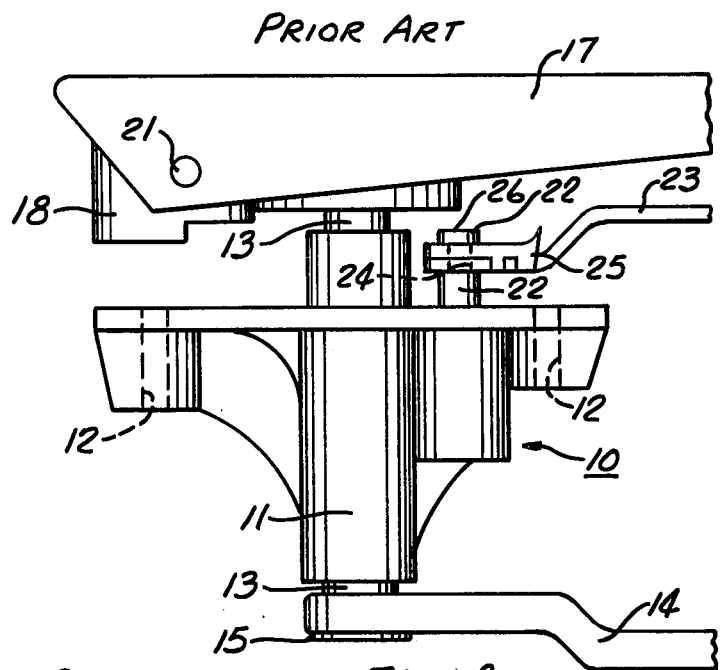
FIG. 1 is a prior art view in side elevation illustrating a dual arm windshield wiper blade transmission assembly with portions thereof broken away.

The conventional dual arm windshield wiper blade transmission assembly 10 comprises a cast transmission body 11 which is provided with bolt passages 12 for securing the same to the motor vehicle body below the vehicle windshield. A shaft 13 is received through a bore in the transmission body 11 for reciprocal rotation of the shaft. Reciprocal rotation of the shaft 13 is accomplished by a conventional windshield wiper blade drive (not shown) which reciprocates lever arm 14, which in turn, is rigidly secured to shaft 13 as indicated at 15. A grooved annular head 16 (see FIGS. 2 through 4) is rigidly secured to the top or other end of shaft 13 for attachment thereto of the main wiper blade arm 17. Head 16 is cooperatively received in a correspondingly shaped recess in the main wiper blade arm mounting block 18. This cooperative recess has corresponding ribs to mesh with the ribs 19 provided on head 16 in order to prevent relative rotation between head 16 and wiper blade mounting block 18. Head 16 is also provided with key 20 which is received in a corresponding key slot within mounting block 18 to further insure that there is no relative rotation between the two parts.

Wiper blade arm 17 is pivotally secured at 21 to mounting block 18 in the conventional manner so that wiper blade arm 17 may be raised away from the vehicle windshield surface.

Conventional guide arm pivot pin 22 is rigidly secured to transmission body 11 and it extends in parallel therefrom to shaft 13 adjacent head 16. This pivot pin 22 pivotally receives one end of wiper blade guide arm 23 within annular groove 24 of pin 22. Secure pivotal engagement of guide arm 23 within annular groove 24 is maintained and insured by wiper blade guide arm clip 25. This is a conventional arrangement on most present day motor vehicles, and the clip 25 may be slid sideways in order to disengage guide arm 23 from pivotal engagement with guide arm pivot pin 22.

Figure 2:
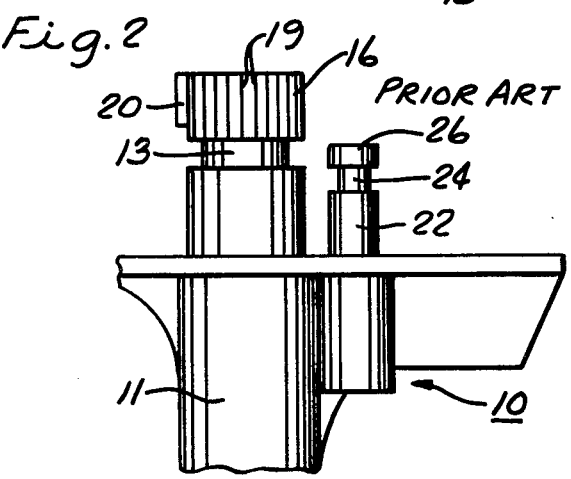
FIG. 2 is an enlarged view of a portion of the wiper blade transmission assembly illustrated in FIG. 1 with the main wiper blade and wiper blade guide arm removed to expose the conventional guide arm pivot pin.

FIG. 2 illustrates head 16 and guide arm pivot pin 22 with their respective wiper blade arm 17 and wiper blade guide arm 23 removed. FIG. 2 illustrates the condition of guide arm pivot pin 22 in new factory condition.

The other end of wiper blade guide arm 23 which is not shown in FIG. 1, eventually converges to wiper blade arm 17 and is pivotally connected thereto in the conventional manner. As is well known, this guide arm acts to guide and center the main wiper blade 17 in its action of moving the rubber wiper blade (not shown) over the vehicle windshield surface and also guides the wiper arm blade 17 into a park position when the wiper blades are turned off in a conventional manner.

Figure 3:
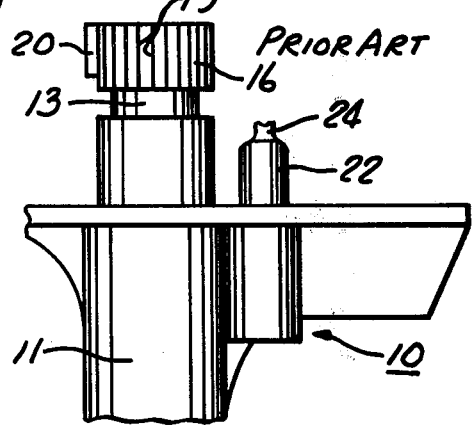
FIG. 3 is identical to FIG. 2, except that the guide arm pivot pin is illustrated in broken and worn condition.

After considerable use of the windshield wipers, the pivoting action of the guide arm 23 about stationary guide arm pivot pin 22 eventually wears the pivot pin in the annular groove 24 until the head portion 26 wears or breaks through as indicated in FIG. 3. The wiper blade guide arm 23 thus becomes detached and the wiper blade 17 thereafter becomes inoperable or ineffective. In this condition, repair can only be made by replacing the entire windshield wiper blade transmission assembly 10 in the motor vehicle, as the guide arm pivot pin 22 is not threadably received within the transmission body 11.

Figure 4:
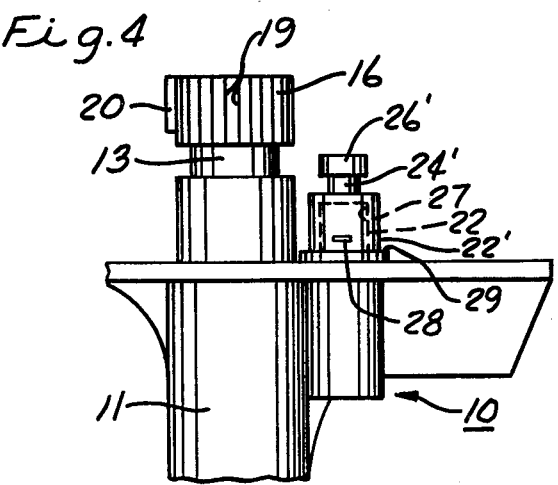
FIG. 4 illustrates the wiper blade transmission assembly shown in FIG. 3 with the guide arm pivot pin replacement part of the present invention shown in assembled condition.

FIG. 4 illustrates the broken remaining base portion of guide arm pivot pin 22 with the replacement pivot pin of the present invention applied thereover.

The replacement guide arm pivot pin 22' of the present invention is provided with an axial bore in the bottom thereof as indicated at 27, which receives the stub portion of the original pivot pin 22 with a force fit to insure that there will not be relative rotation between replacement pin 22' and original pin base 22. To further insure that there will be no relative rotation between replacement pin 22' and pin base 22, a small inwardly struck portion 28 is provided in the side wall of the base portion of replacement pin 22'. This struck portion gouges into the side of pin base 22 and thus more or less acts as a key to prevent relative rotation.

The base portion of replacement pin 22' is, of course, slightly larger in diameter than that of the original pin base 22. However, replacement pin head 26' and groove 24' are identical in shape and size to that of the original pin 22 illustrated in FIG. 2.

Figure 5:
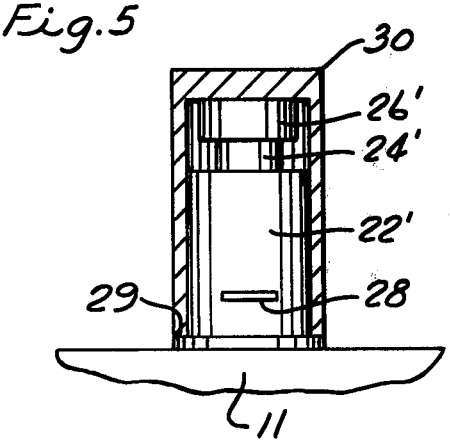
FIG. 5 is an enlarged view of the guide arm pivot pin replacement part of the present invention illustrated in FIG. 4 with the inverted cylindrical cup-shaped driving tool positioned thereover and illustrated in cross section.

The base of replacement pin 22' is also provided with the annular shoulder 29. This annular shoulder is provided as a seat for a cylindrical inverted cup-shaped tool utilized to drive the replacement pin 22' onto the stub portion 22 of the old pin as illustrated in FIG. 5.

The inverted cup-shaped driving tool 30 is shown in vertical cross section to illustrate how it seats over top of replacement pin 22' and rests at its bottom on annular shoulder 29. Replacement pin 22' is thus driven onto the remaining stub portion 22 of the original pin by applying hammer blows to the top of tool 30. Tool 30 fits with easy sliding engagement over the outside of the base portion of replacement pivot pin 22' so that once it is completely seated, tool 30 is easily slid off of the seated pin 22' and the guide arm 23 is reattached.

It should also be noted that at times it will be desirable to file off the remaining top projections of the broken guide arm pin 22 which are shown in FIG. 3. These are filed off so that the top of the remaining base portion is flat as indicated in FIG. 4 to insure that the replacement guide arm pivot pin 22' will fully seat against the body 11.

I claim:

1. A dual arm windshield wiper blade transmission assembly comprising, a transmission body, a shaft received through a bore in said body for reciprocal rotation therein, a lever secured to one end of said shaft for imparting reciprocal rotation thereto, a head secured to the other end of said shaft for attachment of a wiper blade arm, and a guide arm pivot pin secured to said body in parallel to said shaft and adjacent to said head to pivotally receive a wiper blade guide arm thereon, the improvement consisting of a replacement guide arm pivot pin coaxially received in stationary engagement over a remaining broken base portion of said pivot pin.

2. The dual arm windshield wiper blade transmission assembly of claim 1 wherein said replacement guide arm pivot pin includes an annular outwardly extending shoulder at the base thereof.

3. The dual arm windshield wiper blade transmission assembly of claim 2 including an inverted cup-shaped cylindrical tool received over said replacement pin and annularly seated on said annular shoulder.

4. The dual arm windshield wiper blade transmission assembly of claim 1 wherein said replacement pin includes at least one inwardly struck portion in the side of the base thereof to engage said remaining broken base portion of said pivot pin.

5. The dual arm windshield wiper blade transmission assembly of claim 1 wherein said replacement guide arm pivot pin includes an annular head connected by a narrower stem to the base of said replacement pivot pin, said annular head being slightly smaller in diameter than that of the base of said replacement pin.

6. The method of repairing a broken or worn windshield wiper guide arm pivot pin secured to a wiper blade transmission body comprising the steps of, providing a replacement pin with a base having a bore in one end to receive the remaining base portion of the broken pin therein with force fit, and forcing said replacement pin in force fit endwise onto said remaining base portion.

7. The method of claim 6 including the step of filing off the top of said base portion of the broken pin before the step of forcing said replacement pin thereover.

8. The method of claim 6 including the step of forcing said replacement pin in force fit endwise onto said remaining base portion by applying an inverted cup-shaped member over said replacement pin and thereupon driving said replacement pin with force fit onto said broken pin base portion by the application of hammer blows to the top of said inverted cup member.

* * * * *